United States Patent [19]

Polgreen et al.

[11] Patent Number: 5,552,999
[45] Date of Patent: Sep. 3, 1996

[54] DIGITAL HISTOGRAM GENERATOR SYSTEMS AND METHODS

[75] Inventors: Thomas L. Polgreen; Gary V. Zanders, both of Dallas, Tex.

[73] Assignee: Dallas Semiconductor Corp, Dallas, Tex.

[21] Appl. No.: 566,652

[22] Filed: Dec. 4, 1995

Related U.S. Application Data

[63] Continuation of Ser. No. 139,393, Oct. 20, 1993, abandoned, which is a continuation-in-part of Ser. No. 725,793, Jul. 9, 1991, abandoned.

[51] Int. Cl.$^6$ .................................................. G06F 19/00
[52] U.S. Cl. ............................ 364/481; 364/555; 364/557
[58] Field of Search ............................. 364/481, 482, 364/550, 554, 555, 551.01, 557, 577, 579; 377/13, 16, 20, 25; 382/54; 429/86; 341/120

[56] References Cited

U.S. PATENT DOCUMENTS

| | | | |
|---|---|---|---|
| 4,093,866 | 6/1978 | Kasdan et al. | 250/563 |
| 4,116,980 | 9/1979 | Apostolos et al. | 324/77 R X |
| 4,189,778 | 2/1980 | Vogel | 364/482 |
| 4,211,919 | 7/1990 | Ugon | 235/487 |
| 4,400,450 | 8/1983 | Wagner | 429/86 |
| 4,480,178 | 10/1984 | Miller, II et al. | 235/380 |
| 4,505,599 | 3/1985 | Nonaka | 374/170 |
| 4,511,796 | 4/1985 | Aigo | 235/492 |
| 4,513,743 | 4/1985 | van Arragon et al. | 128/419 PG |
| 4,551,031 | 11/1985 | Ishikawa et al. | 377/25 |
| 4,556,958 | 12/1985 | Ugon | 395/575 |
| 4,602,871 | 7/1986 | Hanaoka | 377/25 |
| 4,621,190 | 11/1986 | Saito et al. | 235/492 |
| 4,638,443 | 1/1987 | Kaneyasu et al. | 364/497 |
| 4,658,407 | 4/1987 | Iwama | 364/557 |
| 4,748,320 | 5/1988 | Yorimoto et al. | 235/492 |
| 4,767,918 | 8/1988 | Kushima et al. | 235/441 |
| 4,771,393 | 9/1988 | Ishida et al. | 374/170 |
| 4,782,445 | 11/1988 | Pasquini | 377/25 |
| 4,816,656 | 3/1989 | Nakano et al. | 235/380 |
| 4,845,351 | 7/1989 | Hara et al. | 235/492 |
| 4,868,409 | 9/1989 | Tanaka et al. | 307/10.5 |
| 4,897,650 | 1/1990 | Shott III et al. | 341/120 |
| 4,928,000 | 5/1990 | Eglise et al. | 235/380 |
| 5,032,708 | 7/1991 | Comerford et al. | 235/492 |
| 5,033,015 | 7/1991 | Zwirn | 364/579 |
| 5,063,607 | 11/1991 | Fitzhenry et al. | 382/50 |
| 5,079,716 | 1/1992 | Lenhardt et al. | 364/483 |
| 5,388,134 | 2/1995 | Douglass et al. | 364/577 X |
| 5,388,168 | 2/1995 | Sakashita et al. | 382/54 |

FOREIGN PATENT DOCUMENTS 0147099  7/1984  European Pat. Off. .

OTHER PUBLICATIONS

Kirkwood et al. "Diagnosing Battery Behavior with an Expert System in Prolog" Conference 21st Intersociety Energy Conversion Eng. abstract Aug. 1986.

*Primary Examiner*—Emanuel T. Voeltz
*Assistant Examiner*—M. Kemper
*Attorney, Agent, or Firm*—Jenkens & Gilchrist

[57] ABSTRACT

A histogram generator system uses a sensor to periodically sample a value of a physical variable to produce at least one sample of the physical variable and a selector allocate each sample of the value of the physical variable into a corresponding counter of a counter array. The counter accumulates a number of occurrences of the value of the sample(s) of the physical variables.

7 Claims, 10 Drawing Sheets

DIGITAL HISTOGRAM GENERATOR SYSTEMS AND METHODS

CROSS-REFERENCE TO RELATED APPLICATIONS

This application is a continuation-in-part (CIP) of Application No. 08/139,393, filed on Oct. 20, 1993, which was abandoned upon the filing hereof which is a continuation-in-part of the following application, which is assigned to Dallas Semiconductor, the assignee of this application: Ser. No. 07/725,793, filed Jul. 9, 1991 now abandoned. This application also incorporates by reference another application, which is assigned to Dallas Semiconductor, the assignee of this application: Ser. No. 08/013,883, filed Feb. 5, 1993 U.S. Pat. No. 5,388,134, issued Feb. 7, 1995.

(C) Copyright, Dallas Semiconductor Corporation 1993. All material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

The owners of the copyright and maskwork rights do not have any objection to the facsimile reproduction by anyone of the patent document or the patent disclosure, as it appears in the records of the United States Patent and Trademark Office, but otherwise reserves all copyright and maskwork rights whatsoever.

FIELD OF INVENTION

The present invention relates to electronic devices, and, more particularly, to detection of a physical variable plus time-independent accumulation of the variable detected, using analog and/or digital hardware technology and/or modern software technology.

BACKGROUND

The life and operation of certain products, such as chemical, biological, electrical, and electronic products, is often dependent upon the exposure of these devices and products to specific physical variables, such as light, voltage, current, certain chemicals, air pressure, noise, and humidity. In particular, these specific physical variables trigger chemical reactions in these products. These chemical reactions describe physical conditions, such as the spoilage of perishable products, such as foodstuffs, and the expiration of batteries. These chemical reactions are often measured or monitored by natural laws, such as Arrhenius's Law. The actual rate and state of particular chemical reactions depends upon the exposure of these products to specific physical variables. Thus, if users knew the actual time of exposure of particular products specific variables, they would know exactly when certain products will spoil or expire. Users would then know exactly when to discard or recharge certain products, which would allow them to extend or to effectively utilize the useful life of these products. Users could also use this information to record elapsed real time and product shelf life of certain products.

The life and operation of electrical and electronic products, such as integrated circuitry, computer clocks, or batteries used in portable computers and cellular phones, are often dependent upon their exposure to specific physical variables. In particular, integrated circuits typically consist of devices with temperature dependent operating characteristics. For instance, bipolar transistors and diodes have currents with exponential temperature dependence; resistors of various types have various temperature dependencies, which may be either positive or negative; polysilicon capacitors have positive dependencies; field effect transistor threshold voltages have a negative dependency; and crystals for oscillator control may have resonant frequencies with quadratic maxima as a function of temperature. In fact, recognizing the existence of these relationships, many integrated circuit designs already incorporate forms of temperature compensation. For instance, designers often incorporate a temperature sensor plus a responsive heater as part of an integrated circuit package to maintain the temperature of the integrated circuit at a fixed level above ambient. Alternatively, if only certain characteristics need to be temperature compensated, then designers use special circuits, such as a bandgap generator to provide a reference voltage with only a roughly ±40 parts per million (ppm) variation per degree Celsius. Similarly, designers use a crystal resonance to control the oscillation frequency of an oscillator, even though the oscillation frequency may vary with temperature.

Similarly, the life and operation of timers or clocks that record exposure-related information is inherently dependent upon their exposure to specific physical variables, such as temperature, because they are ultimately dependent upon these relationships as well. In particular, the temperature dependence of the resonant frequency of the crystal of commonly used clock/calendars may be problematic. The commonly used tuning fork quartz crystal with nominal resonant frequency at 32,768 Hz ($2^{15}$ Hz) actually has a parabolic frequency-temperature dependence of:

$$f-f_0=-K(T-T_0)^2$$

where the maximum resonant frequency, $f_0$, is close to 32,768, the temperature of maximum resonant frequency, $T_0$, is close to 25° C., and K is a positive constant. With the maximum resonance frequency occurring at 25° C., the resonant frequency at 0° or 50° C. will be roughly 20 parts per million lower than the nominal maximum of 32,768 Hz. This amounts to the clock running slow and losing several minutes per year. Even in applications where the ambient temperature is well regulated or predictable with the use of specified crystal, such as desktop computers in temperature controlled offices or digital watches on a temperature controlled wrist, these clocks still lose 10–12 minutes per year. In other applications, the loss may be much greater, such as when portable computers may be left in car trunks and encounter very high and very low temperatures in unpredictable cycles. This leads to intolerably poor timekeeping with clocks that use just a crystal for control. This is important, because many electrical and electronic products, such as personal computers, include a clock/calendar that keeps track of the time of day, month, and year in order to time stamp files accurately, insert dates into documents like letters, etc. These clock/calendars are often programmable for setting or changing the date or time of day. Designers typically implement clock/calendars into specific electronic hardware with a dedicated crystal oscillator to provide accuracy and with a battery backup power supply to insure preservation of timekeeping data during an interruption of the primary power supply. This is especially important with personal computers, which are frequently powered down. Likewise, digital watches include a clock/calendar based on a dedicated crystal oscillator and a battery power supply.

Likewise, battery self-discharge and leakage follows an approximately Arrhenius Law independent of the state of charge.

The life and freshness of foodstuffs, such as fruits, vegetables, diary products, and meats, as well as drugs and enzymes, is dependent upon their exposure to specific physical variables, such as temperature as well. 'Spoilage' is essentially a chemical reaction.

Unfortunately, despite the importance of this information, existing systems and methods have not been able to overcome the memory requirements associated with recording large amounts of time-sensitive data, which can be overwhelming. Moreover, existing systems and methods are not easily portable. As a result, this information is not generally available to users of many of the chemical, biological, and electrical and electronic products discussed above.

SUMMARY OF THE INVENTIONS

The present invention generally provides methods and systems with timed detection of a physical variable, such as temperature, and accumulates the detected values into bins to create effectively a histogram of values of the variable for further use, such as to analyze or to compensate for the variance of the physical variable. In particular, the histogram generator system comprises a sensor that periodically samples a value of a physical variable to produce at least one sample of the physical variable and a selector that allocates each sample of the value of the physical variable into a corresponding counter of a counter array. The counter accumulates a number of occurrences of the value of the sample(s) of the physical variables. In addition, the method of monitoring the exposure of a product to various physical variables comprises the following steps of sampling the value of a physical variable to which the product is exposed to provide a sample of the value of the physical variable and allocating each sample of the physical variable to a corresponding counter that accumulates a number of occurrences of the sample of the value of physical variable. Moreover, each sample of the value of the physical variable is generally within a range of values. Selectors in preferred embodiments typically divide this range into a plurality of bins or subsets such that each sample of the physical variable corresponds to at least one bin of the plurality of bins. The selector allocates each sample to a counter of the counter array depending upon the bin or subset that to which that sample of the physical variable corresponds. The bins of the plurality of bins may be of equal or non-equal sizes. Possible physical variables include light, voltage, current, temperature, pressure, noise, and humidity. This information is important for chemical products, pharmaceutical products, biological products, and electrical products, and electronic products.

Preferred embodiments use temperature detector to monitor temperature. More specifically, digital thermometer is used for the temperature detector. Preferred embodiments of the digital thermometer comprise a temperature-to-time first converter and a time-to-number second converter. The first converter outputs a time interval with length depending upon an input temperature. The second converter has an input coupled to a time interval output of the first converter, whereby the second converter outputs a number version of the input temperature. Additionally, the first converter may comprise a first oscillator with a temperature dependent period coupled to a counter. The time interval is the time for the counter to count a predetermined number of oscillations of the first oscillator; and the second converter comprises a second oscillator coupled to a second counter, which counts the oscillations of the second oscillator for the time interval. The second converter may also comprise a prescaler between the second oscillator and the second counter, which blocks a fraction of the oscillations from the second oscillator from driving the second counter. Similarly, the digital thermometer may comprise an output temperature register, and a repetition controller coupled to the first and second converters and the output temperature register, wherein during the time interval of the controller loads a base count into the second counter and a base temperature into the output temperature register, loads a slope count into the second counter when the second counter has counted down the base count, increments the base temperature in the output temperature register when said second counter has counted down said slope count, loads a second slope count into said second counter, and repeats incrementing the contents of the output temperature register and slope loading until the time interval expires. The second converter includes a slope incrementer coupled to the second counter and to the controller.

Alternative embodiments monitor the temperature as well as include a selector that comprises a plurality of resistors in series, a second current source, a plurality of comparators that form a comparator array, and a plurality exclusive OR gates that form an exclusive OR gate array. Each comparator of the plurality of comparators have a first input and a second input and an output. Each exclusive OR gate of the exclusive OR gate array having a first and second input and an output. The current source is connected to the plurality of resistors to provide a plurality of reference voltage inputs into the first inputs of each comparator of the plurality of comparators. The sensor comprises a thermistor and a first current source to drive said thermistor to detect the physical variable and transform the physical variable into a first voltage that corresponds to the physical variable. The first voltage is inputted into the second inputs of each comparator of the plurality of comparators. The outputs of the plurality of comparators are coupled to the first and second inputs of said plurality of exclusive OR gates. The outputs of each exclusive OR gate of the plurality of exclusive OR gates connect to the corresponding counter of the counter array.

The fact the preferred embodiments accumulate this information in this fashion is advantageous, because this method discards the time of detection information and, thus, substantially reduces memory storage requirements and the associated power required to actively store and process the data. Often, the analysis and/or compensation for many physical variables requires a statistic, such as a weighted sum over time, which the systems and methods described above can supply. As a result, typical applications needing this histogram information use this information to solve natural equations and to compute the relevant system characteristics with a variety of software and hardware configurations. For example, in a chemical reaction following the Arrhenius rate law, the fraction of reactants having already reacted at a certain time is expressed by an integral over time of the reaction rate as a function of time; the particular times of high reaction rates and the particular times of low reaction rates do not matter. Similarly, for a temperature sensitive crystal oscillator clock, at the end of a time period (such as a day), the time correction needed depends upon the weighted sum of the time intervals of low oscillation frequency and not the particular times of low oscillation frequency. The required storage capacity may be reduced significantly. For example, the measurement and storage of temperature every second for a year with 1 degree resolution over a 128 degree range would require 221 million bits of digital storage. On the other hand, a temperature histogram with the same time and temperature resolution would require only 3200 bits.

Other advantages stemming from the availability of this information is that it allows lifetime monitoring procedures to be more easily implemented. The storage savings also permit the precision of information or sampling rate to be adjusted and increased (i.e., 1 sec./1e9 sec.), using various crystals. In particular, low, medium, & high precision options would entail the use of two crystals for high resolution, one crystal for medium precision, and zero crystals for low precision.

In addition, a clock plus histogram generator could be built into a battery pack (and powered by the battery itself) and thereby keep track of the temperature history after a recharge. Then, upon insertion into a portable computer, the computer could read the histogram generator counters' contents and compute the charge state of the battery pack. In fact, all periods of non-use of the battery pack could be histogrammed and combined with data on actual computer use to gauge accurately the current state of charge of the battery pack.

Other advantages pertain to the size advantages that stem from the fact these systems and methods could be implemented using microelectronic circuitry and, thus, are much more portable than existing technologies.

BRIEF DESCRIPTION OF THE DRAWINGS

Further features and advantages will become apparent from the following and more particular description of the various embodiments of the invention, as illustrated in the accompanying drawings.

DETAILED DESCRIPTION OF THE PREFERRED EMBODIMENTS

The state and rate of chemical reactions often underlie many of the nature of physical conditions. These chemical reactions theoretically proceed at a rates that often depend exponentially upon temperature and an activation energy. For instance, reaction rates are often approximated by natural laws, such as Arrhenius's Law. Arrhenius's Law provides:

$$r = Ae^{-E_a/T}$$

where A is a constant, $E_a$ is an activation energy, and T is the absolute temperature. For most chemical reactions, the activation energy lies in the range of 50 to 100 Kj/mol (about 0.5 to 1 Ev per molecule). Alternatively, a chemical reaction theoretically proceeds at a rate that depends upon temperature as $\sqrt{T} \exp(-E_a/RT)$ with T as the absolute temperature, $E_a$ as the activation energy per mole, and R as the gas constant. Expressing the activation energy in terms of energy per molecule yields the temperature dependence form as $\sqrt{T} \exp(-E_a/Kt)$ with k Boltzmann's constant. In practice, the exponential dependence overwhelms the square root dependence, and a temperature dependence expressed by the exponential alone suffices and constitutes Arrhenius's Law. Arrhenius's Law is the basis of the well-known chemical rule of thumb which states that reaction rates approximately double for each 10 degree rise in temperature. Typical values of the activation energy are roughly 50 to 100 Kj/mol or, equivalently, about 0.5 to 1.0 Ev/molecule.

Preferred embodiments of the histogram generator store temperature and time information in a form that is convenient in terms of memory storage as well as in a format that is useful to the user. For a discrete number of temperatures, the stored data will correspond to the length of time exposed to each temperature. This data can then be retrieved and post processed with respect to any function of the form:

$$F = \int_{t_0}^{t_1} g(T) \, dt$$

Preferred embodiments implement the following procedure to measure and store temperature and time data in the form of a time vs. temperature histogram. The elapsed useful life, $T_{elapsed}$, of a system which obeys the Arrhenius rate equation is an example in this case. Thus, $T_{elapsed}$ can be approximated as follows $$T_{elapsed} = \int_{t_0}^{t_1} rAe^{-Ea/T(t)} \, dt.$$

These implementations evaluate expressions of the form:

$$A = \int_{t_0}^{t_1} f(V(t))\, dt.$$

Figure 1:
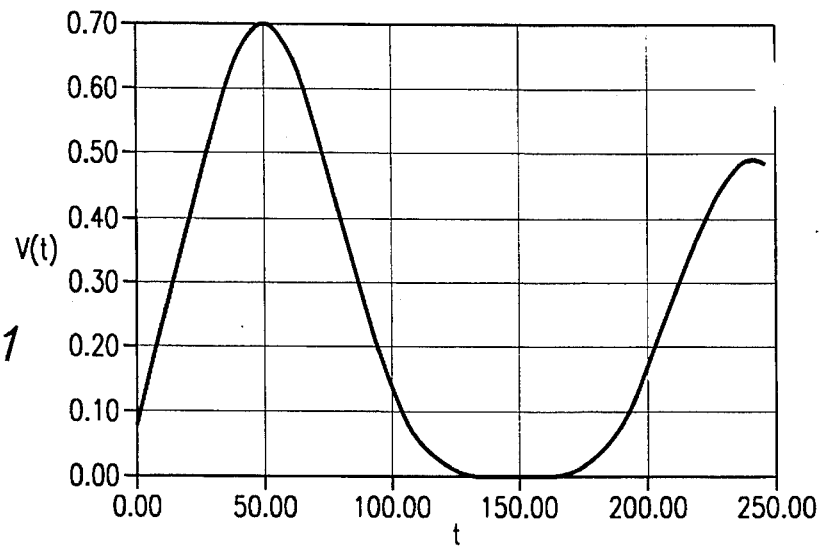
FIG. 1 is a graph that illustrates an example of a possible functional relationship between the continuous variables V and t.
Figure 2:
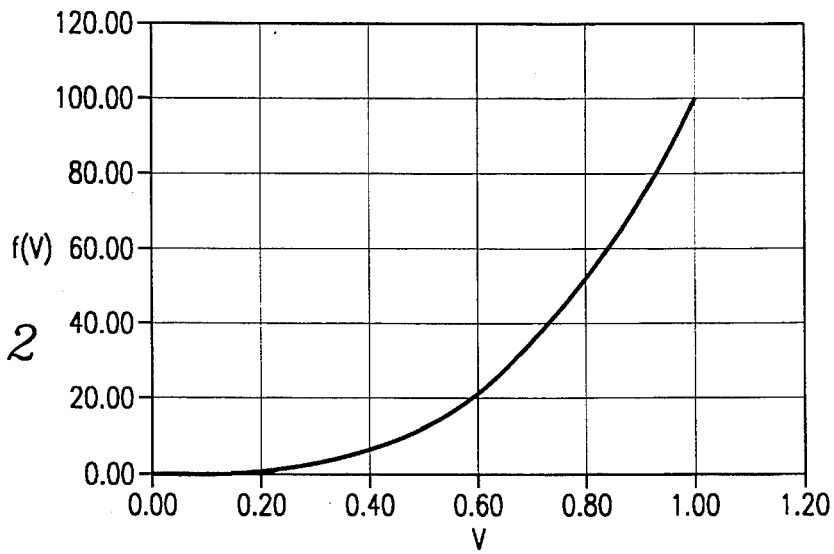
FIG. 2 is a graph that illustrates an example of a possible functional relationship between the continuous variables V and f(V).
Figure 3:
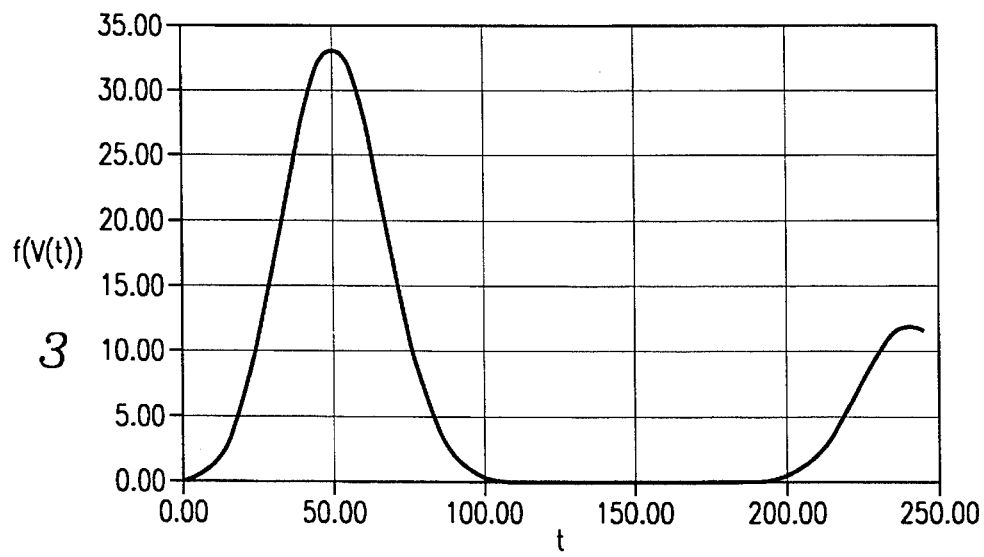
FIG. 3 is a graph that illustrates an example of a possible functional relationship between the continuous variables f(V(t)) and t.

V(t) is a variable which varies in time and f(V) is a function of V with no explicit time dependence. FIG. 1 is a graph that illustrates an example of a functional relationship between the variables V and t. Similarly, FIG. 2 is a graph that illustrates an example of the functional relationship between the variables V and f(V). FIG. 3 is a graph that illustrates an example of a possible functional relationship between the continuous variables f(V(t)) and t. Digital implementations approximate this integral with the following summation as follows:

$$\sim \sum_{i=0}^{N} \Delta t\, f(V(t))$$

where $N=(t_1-t_0)/\Delta t$. The accuracy of this approximation is determined by the magnitude of N, the larger N, is, the better the sum represents the integral. A second approximation is made by assuming that f(V) assumes discrete values:

$$f(V) \sim \Sigma f_j \theta(V-V_j)\theta(V_{j+1}-V)$$

where $$\theta(x) = \begin{array}{l} 1; \text{for } x \geq 0 \\ 0; \text{for } x < 0. \end{array}$$

In this case, f(V) is replaced by $f_j$ when $V_j < V \to V_{j+1}$. The accuracy of this approximation is determined by the number, M, of discrete values of $f_j$ and the choice of the values $V_j$. Note that generally M<<N. The integral may now be represented by:

$$\sim \sum_{i=0}^{N} \sum_{j=0}^{M} f_j\, \theta\,(V(t_i) - V_j)\, \theta\,(V_{j+1} - V(t_i))\, \Delta t$$

It is now possible to exchange the order of the summations without any further approximation:

$$= \sum_{j=0}^{M} f_j \sum_{i=0}^{N} \Delta t\, \theta\,(V(t_i) - V_j)\, \theta\,(V_{j+1} - V(t_i))$$

The second summation represents the total time, $T_j$, for which V(t) is between $V_j$ and $V_j=1$:

$$T_j = \sum_{i=0}^{N} \Delta t\, \theta\,(V(t_i) - V_j)\, \theta\,(V_{j+1} - V(t_i)).$$

Figure 4:
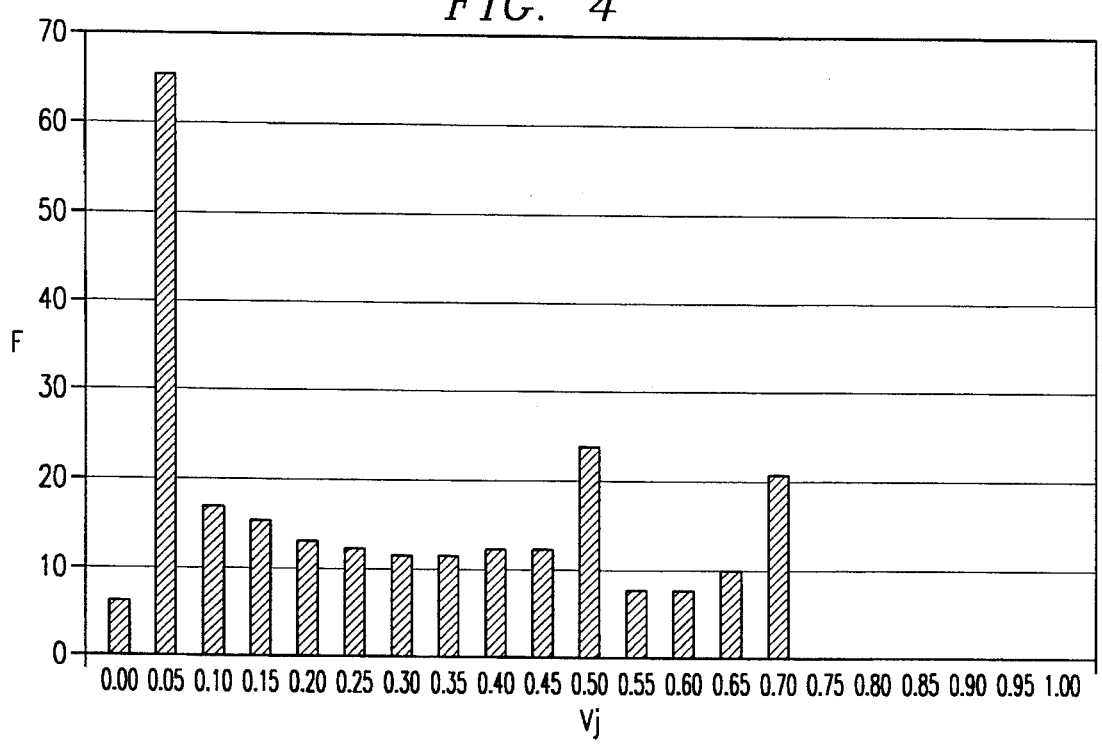
FIG. 4 is a graph that illustrates an example of a possible functional relationship between the discrete variables $T_j$ and $V_j$.

FIG. 4 is a graph that illustrates an example of a possible functional relationship between the discrete variables $T_j$ and $V_j$. Thus, the integral $$A = \int_{t0}^{t1} f(V(t))\, dt.$$

may be represented by:

$$A \sim \sum_{j=0}^{M} f_j * T_j$$

A major advantage of utilizing this procedure to manipulate the integral is to save storage space. In particular, if one were to evaluate the integral by measuring the storing f(V(t)) for each of N values of t, the storage requirements would be:

Storage Requirements=N * ln (M)/ln(2), whereas using the histogram generator procedure, described above, reduces the storage requirements to:

Storage Requirements=M*ln(N)/ln(2).

Figure 5:
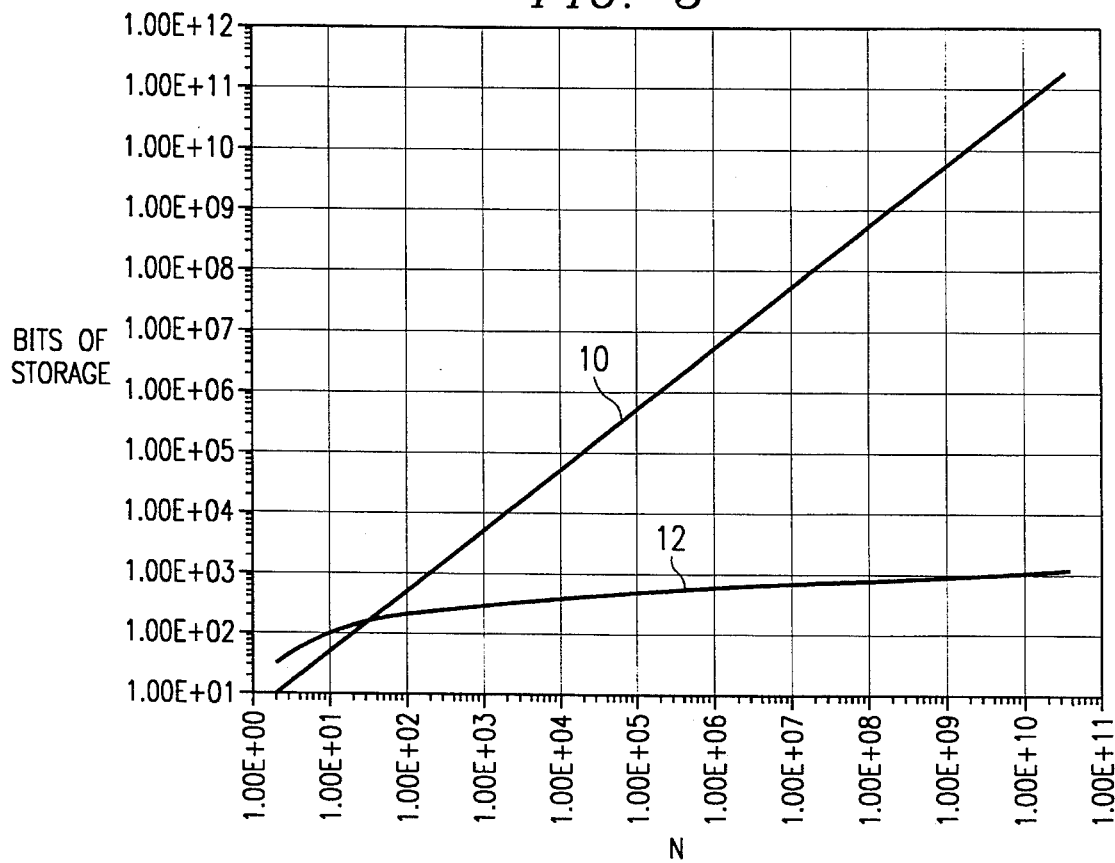
FIG. 5 is a graph that illustrates the savings in memory storage space associated with preferred embodiments of the invention by showing a comparison of the storage required for any particular implementation of the histogram generator vs. the storage required to store all measured data.

The savings in storage space are graphically illustrated in FIG. 5, which is a plot of the first equation 10 which relates to the storage space required when all temperature data is stored as well as a plot of the second equation 12, which relates to the storage space required when the histogram generator is used. The storage requirement in bits is plotted as a function of the number, N, of time periods with M chosen to be 32. For instance, if t is one second and the integration is over 1 year, then $N=3.1*10^7$. With M chosen to be 32, (i.e., 32 discrete values for f(V)), then the total storage requirements would be $1.6*10^8$ bits of data, whereas, if the histogram method is used, only 800 bits are needed. These storage savings also provide power savings in that less memory requires less power.

System Diagram Of a HistoGram Generator

Figure 6:
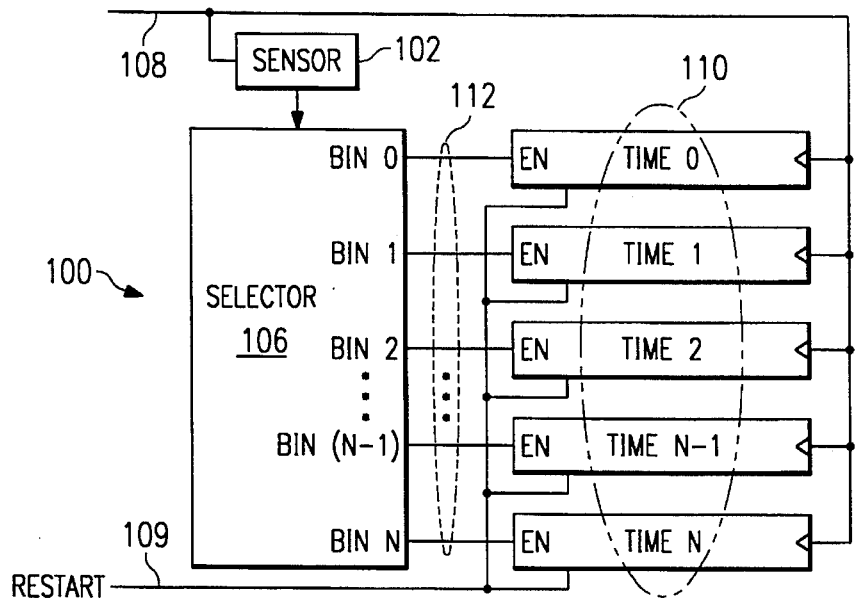
FIG. 6 is a preferred functional/structural block circuit diagram of a histogram generator.

FIG. 6 shows a preferred functional/structural block circuit diagram of a histogram generator, generally denoted by reference numeral 100, which includes sensor 102, selector 106, and a plurality of counters that form counter array 110. Please note that the actual circuitry for reading the contents of the counter array 110 has been omitted for clarity. Sensor 102 senses the specific physical variable of interest (i.e., temperature) with respect to the real time clock bus 108 and inputs its samples into selector 106, which inputs the data into the appropriate counter array 110 via a plurality of connections 112. Please note that histogram generator 100 can be formed as a single integrated circuit, which includes the clock connected to real time clock bus 108 (not shown). A real time clock signal on line 108 triggers sensor 102 to output the current sample from sensor 102 to selector 106. Selector 106 compares the current input from sensor 102 with bin or subset boundaries (i.e., preset temperatures) and outputs a signal on one of the lines 112 depending upon which into bin or subset of the current sensor reading falls. An output signal then enables the corresponding one of counters in the plurality of counters in counter array 110 to increment when clocked. A signal on line 109 resets the counters in counter array 110, and release of the reset begins another interval of sampling and incrementing. Typical applications needing this histogram information use this information to solve the equations like those described above and to compute the relevant system characteristics with a variety of software and hardware configurations.

Figure 7A:
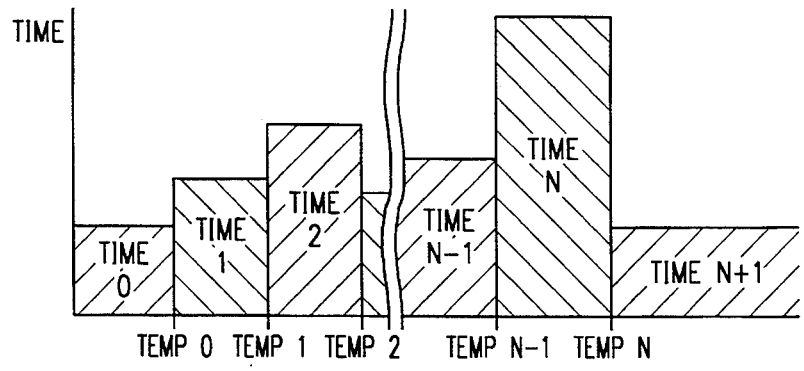
FIG. 7A is a histogram output of preferred embodiments of the histogram generator with bins that are equal-spaced.
Figure 7B:
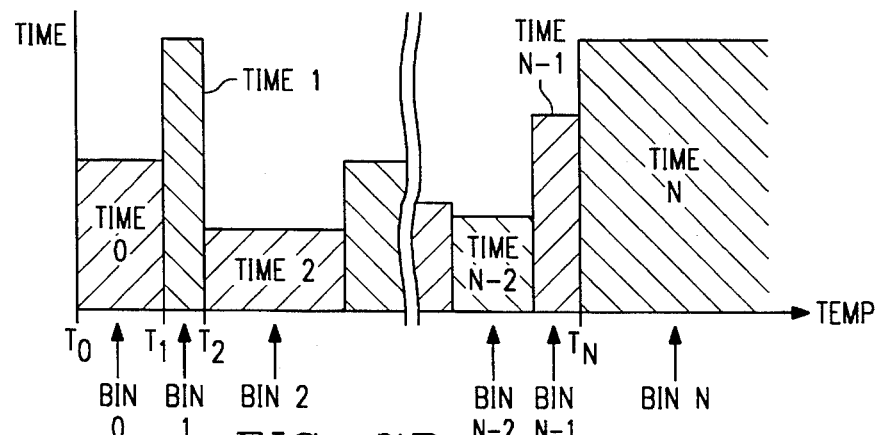
FIG. 7B is a histogram output of preferred embodiments of the histogram generator with bins that are not equal-spaced.

Thus, for each sampling by sensor 102, histogram generator 100 increments one counter of counter array 110 that corresponds to the particular bin or subset storing the current count of the particular sensor samples it is responsible for counting. After an interval of sampling and incrementing, counters of counter array 110 can be read to generate the histogram as illustrated in FIGS. 7A and 7B. The contents of counter Time 0 equals the number of samplings which yielded a temperature in the range from $T_0$ to $T_1$ that define Bin 0, the contents of counter Time 1 is the number of samplings in the Bin 1, and so forth. The bins or subsets may be equal-spaced, such as those bins graphically illustrated in FIG. 7A or not equal-spaced, such as those bins graphically illustrated in FIG. 7B. In fact, for tracking Arrhenius Law reactions, the exponential weight placed on higher temperatures suggests greater resolution at higher temperatures and thus narrower bins at higher temperatures.

Preferred Analog and Digital Embodiments of the Histogram Generator

Figure 8:
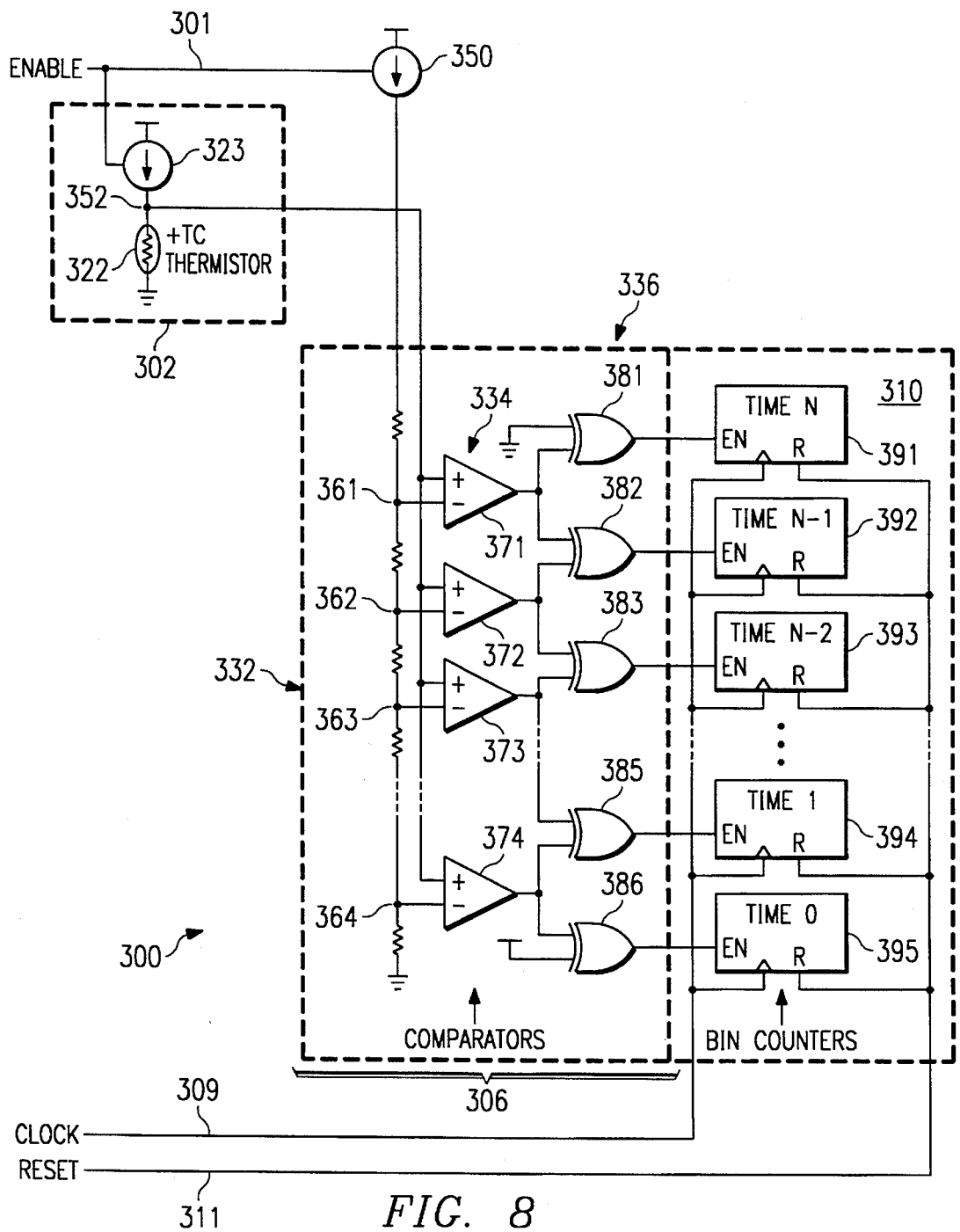
FIG. 8 is a preferred embodiment of the histogram generator that uses analog components.
Figure 9:
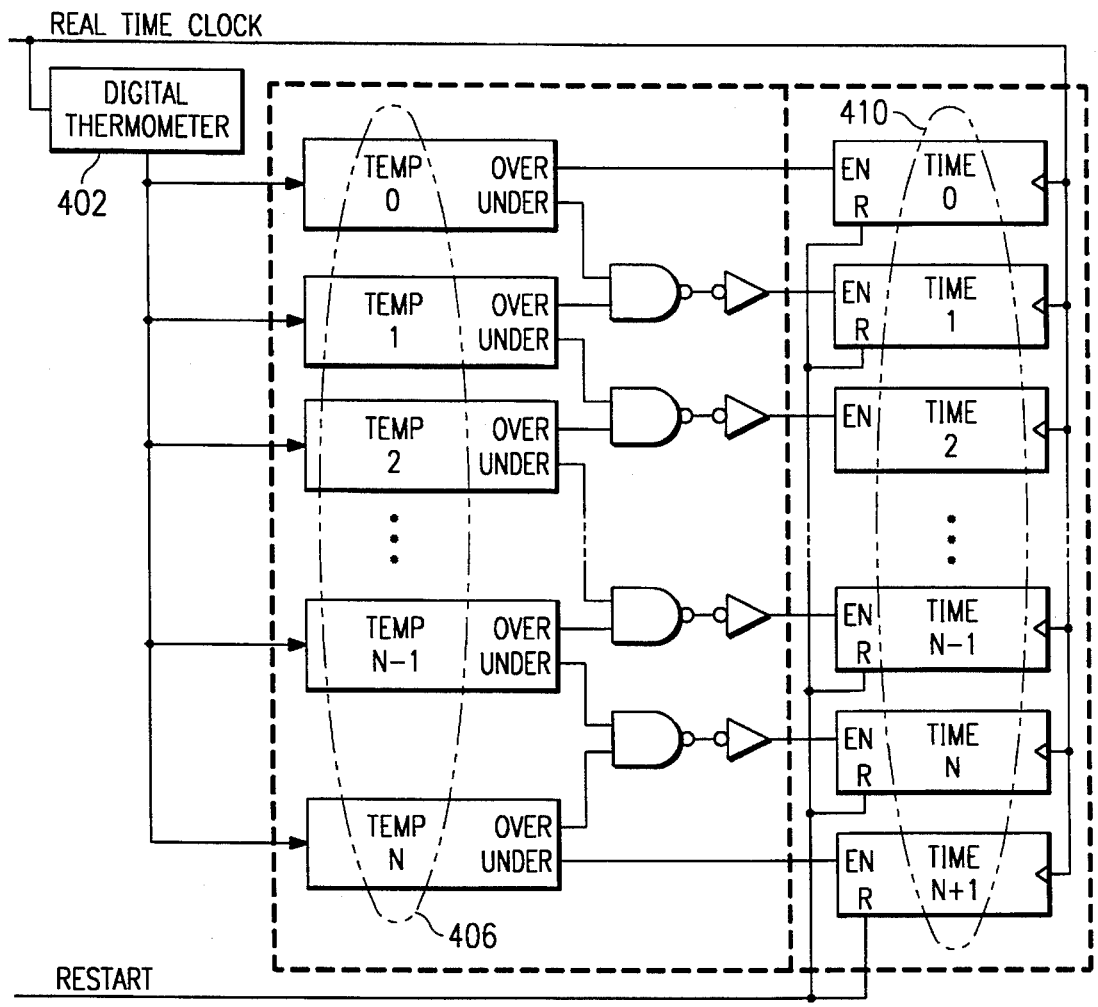
FIG. 9 is a preferred embodiment of the histogram generator that uses digital components.

FIGS. 8 and 9 illustrate detailed preferred analog and digital embodiments of the histogram generator that correspond to the overall system design disclosed in FIG. 6, respectively. FIG. 8 illustrates a preferred embodiment of the histogram generator using analog components. FIG. 9 shows a preferred embodiment of the histogram generator using digital components. It should be noted that in some preferred embodiments the specific analog and digital components shown in FIGS. 8 and 9 could be intermixed in certain situations to produce additional embodiments. In addition, it should also be noted that while the components shown in FIGS. 8 and 9 that correspond to Sensor 102 in FIG. 6 are primarily temperature sensors (both digital and analog embodiments), other sensors that monitor other physical variables, such as pressure, radiation, light, voltage, current, certain chemicals, air pressure, noise, and humidity could be inserted without changing the remainder of the histogram generator 100 shown in FIG. 6. Specific adjustments, however, pertaining to whether sensor 102 (in FIG. 6) is analog or digital in nature may need to be made to the rest of the histogram generator 100 (in FIG. 6) to accommodate the needs of the nature and type of sensors used.

Referring to FIG. 8, a preferred analog embodiment of histogram generator 300 is shown. Enable 301 effectively turns on histogram generator 300. RESET 311 resets histogram generator 300. Sensor 302, which corresponds to sensor 102 in FIG. 6, which are typically LM335 with a 10 mV/degrees K output, where 273 degrees K equal a 2.73 volt output. In this embodiment, sensor 302 is an analog thermometer, which comprises a positive thermal coefficient (+TC) thermistor 322 and a first current source 323 to drive thermistor 322. Microprocessors with A/D convertors can calculate temperature and use a clock pulse on line 309 to build a time/temperature histogram, such as those shown in FIGS. 7A AND 7B. Selector 306, which corresponds to selector 106 in FIG. 6, comprises a plurality of resistors in a resistor string 332 with a plurality of comparators 371, 372, 373, . . . , 374 in an comparator array 334, and exclusive OR decoder array 336. A signal on reset line 311 resets the counters 310, and release of the reset begins another interval of sampling and incrementing. A signal on the clock line 309 increments the counters in counter array 310.

Histogram generator 300 operates as follows. When an enable is asserted on ENABLE BUS 301, current source 323 applies a fixed current to thermistor 322; thus, the voltage at node 352 depends upon the resistances of thermistor 322 and, thus, increases with increasing temperature. This voltage at node 352 provides the positive inputs to each of the comparators in comparator array 334. Current source 350 turned on also applies a fixed current to resistor string 332 and generates reference voltages at nodes 361, 362, 363, etc., which provides the negative inputs for the comparators of array 334. These reference voltages effectively define the bin boundaries. For example, suppose at a temperature T the voltage on node 352 falls between the reference voltages on nodes 362 and 363, then comparators 371 and 372 will output lows and comparators 373, 374, . . . will all output highs. These comparator outputs will drive exclusive OR gates 381, 382, 383, . . . , 384, 385. Now exclusive OR gate 383 will have one high input and one low input because comparator 372 is low and comparator 373 is high. All other exclusive OR gates will have two inputs which are the same and, thus, will output lows. Indeed, exclusive OR gates 381 and 382 will each have two low inputs and the remainder of the exclusive OR gates 383, . . . , 385, 386, will each have two high inputs. Because only exclusive OR gate 383 is high, only counter 393 of counters 310 will be enabled and increment on the next Clock line 309.

FIG. 9 illustrates a preferred digital embodiment of the Histogram Generator shown in FIG. 6. Digital thermometer 402 in FIG. 9 corresponds to Sensor 104 of FIG. 6. Digital temperature sensor 402 provides a digital temperature sample to digital comparators in digital comparator array 406. Again, the outputs of the comparators in comparator array 406 are decoded and drive bin counters 410. Each of the digital comparators in comparator array 406 have a reference digital temperature held in a register analogous to the reference voltages from comparators 406. Reference temperatures held in registers permits simple changes of the bin or subset boundaries by just loading new values into the reference registers. Digital temperature sensing and digital comparison has the advantage of avoiding the usual analog problems of noise and power supply voltage dependence.

Analog problems are addressed in the digital temperature sensor 402 design as well. Digital thermometers may be convenient in certain cases. The digital thermometer needs to provide a digital output that is readable by a microprocessor. Preferred digital embodiment includes the particular versions of digital thermometers shown in FIGS. 10A, 10B, and 10C and of FIG. 11.

Figure 10A:
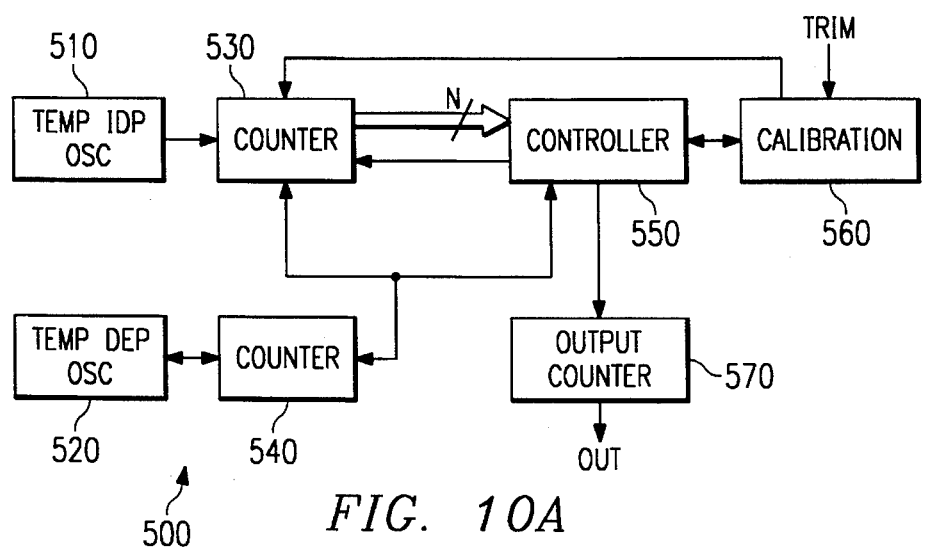
FIG. 10A is a preferred embodiment temperature detector.
Figure 10B:
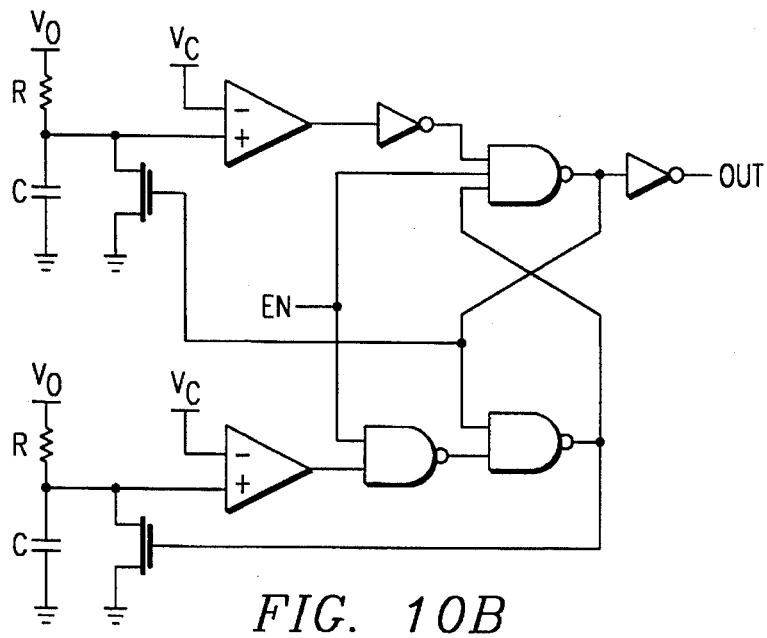
FIG. 10B is a detailed description of the oscillators 510 and 520 in FIG. 10A, but with different types of resistors which leads to their differing temperature dependencies.

In particular, FIG. 10A illustrates a preferred embodiment temperature detector, generally denoted by reference numeral 500, and including temperature insensitive oscillator 510, temperature sensitive oscillator 520, counter 530, circular counter 540, controller 550, intercept and slope registers 560 for calibration, and output counter 570. Counter 530 counts the oscillations of oscillator 510, and counter 540 counts the oscillations of oscillator 520. Oscillators 510 and 520 each have the structure shown in FIG. 10B but with different types of resistors, which leads to their differing temperature dependencies. The period, t, of oscillation of the RC oscillator of FIG. 10B equals:

$$t = 2RC\ln[V_0/(V_0-V_c)] + 2K$$

where K is the propagation delay through one of the comparators and NAND-gate flip-flop structures plus overdrive time due to finite gain and slew rate in the comparators. Of course, R, C, $V_0$, $V_c$, and K all depend upon temperature. However, if $V_c$ is taken to be a fraction of $V_0$, such as by use of a voltage divider, then the natural logarithm will be independent of both $V_0$ and $V_c$. The linear approximation for the resistance R of the resistor is $$R(T) = R(T_0)[1+\alpha\Delta T]$$

where $R(T_0)$ is the resistance at a reference temperature $T_0$, $\alpha$ is the temperature coefficient of resistance (TCR), and $\Delta T$ equals $T-T_0$. Now $\alpha$ roughly equals +5300 parts per million per degree Celsius (ppm/°C.) for n-well diffused resistors in silicon integrated circuits, but has a value of roughly 850 ppm/°C. for standard polysilicon resistors. The capacitance similarly has a temperature coefficient on the order of +100 ppm/°C., and the propagation delay for CMOS devices has a temperature coefficient of roughly 1500 ppm/°C.

Oscillator 510 employs polysilicon resistors and oscillator 520 uses diffused resistors; this difference provides the temperature sensitivity characterizations of the oscillators. Indeed, oscillator 520 slows down more than oscillator 510 as temperature increases due to its greater tempco resistors. Also, oscillators 510 and 520 each oscillate at about 200 Khz, so the period is on the order of 5 microseconds (μs) and this makes the propagation delay K, which is roughly 100 nanoseconds (ns), which is small compared to the RC term in the oscillation period expression.

When a temperature reading is requested, oscillators 510 and 520 run and detector 500 measures temperature roughly as follows. For simplicity, first presume counter 530 contains an initial count of 0 and counter 540 is initially loaded with a count of N, which is on the order of 1000. Counter 540 will count down to 0 and this will generate a disable signal for counter 530 to stop counting until cleared and reenabled. Now the time required for counter 540 to count N oscillations from oscillator 520 equals $$N\{2R_{HI}(T)C_{HI}(T) \ln[V_0/(V_0-V_c)]+2K_{HI}(T)\}=Nt_{HI}(T)$$

where the subscript HI indicates oscillator 520 with a high temperature dependence. During this time interval of length $Nt_{HI}(T)$ counter 530 has counted a total of M(T) counts where $M(T)=Nt_{HI}(T)/t_{LO}(T)$ with $t_{LO}(T)$ the period of oscillator 510 which has a low temperature dependence. The propagation delays are small compared to the oscillator periods, so their temperature variation can be ignored. And the temperature dependence of the capacitance is the same for both oscillators and effectively cancels out. Thus, choosing resistor $R_{LO}$ of oscillator 510 with a small TCR implies that only the temperature variation of $R_{HI}$ of oscillator 520 need be considered and M(T) has the form:

$$M(T)=N\{R_{HI}[1+\alpha\Delta T]C_{HI}\ln[V_0/(V_0-V_c)]+K_{HI}\}/\{R_{LO}C_{LO}\ln[V_0/(V_0-V_c)]+K_{LO}\}$$

where all of the parameters are temperature independent. This shows that M(T) depends linearly on T under these approximations.

The number of counts in counter 530 when counter 540 counts down to 0 depends upon temperature and increases with increasing temperature. For example, with diffused and polysilicon resistors in oscillators 520 and 510, respectively, both oscillators running at roughly 200 Khz, and N about 1000, M(T) varies by about 5 counts per degree Celsius and M(T₀) equals about 1000. And counter 540 takes about 5 milliseconds to count down from 1000 to 0, so a measurement cycle takes a little more than 5 milliseconds.

Figure 10C:
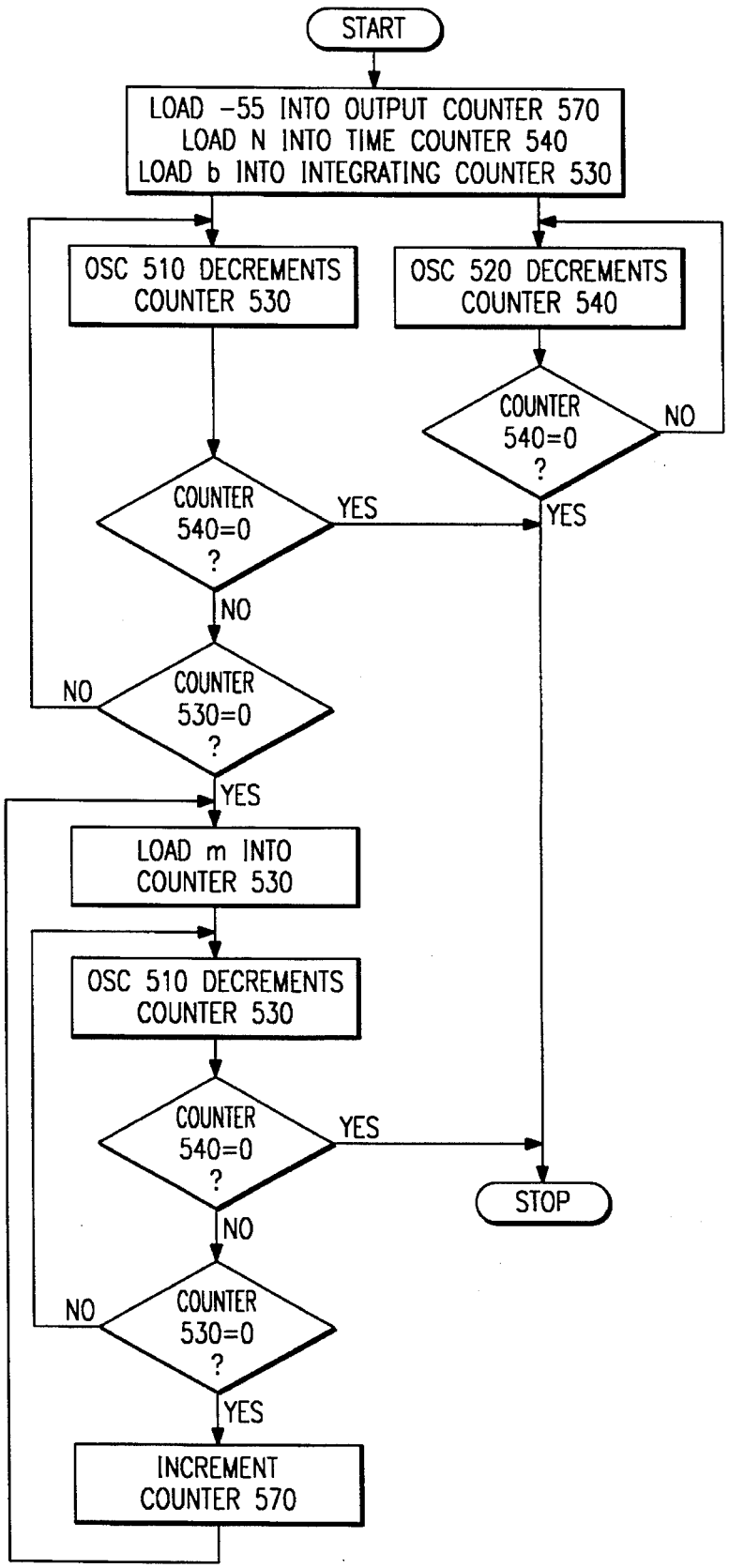
FIG. 10C is a flow chart describing the flow of the digital thermometer shown in FIG. 10A.

Detector 500 does not directly use a total number of counts in counter 530, but rather makes repetitive count downs with counter 530 to increment the output temperature in register 570 and thereby directly read out degrees Celsius over a range of −55° C. to +125° C. as illustrated in the flow chart of FIG. 10C. Indeed, registers 560 contain a constant b for the count when the temperature is −55° C. and a constant m for the ratio of counts to degrees. Constants b and m are determined empirically during a calibration, and in the foregoing example with the reference temperature $T_O$ equal 20°−C, b would equal 625 and m would equal 5.

Referring to FIG. 10C, the flow in FIG. 10C proceeds as follows. First, counters 530 and 540 are initialized at b and N, and counter 570 has −55 loaded. Then counters 530 and 540 start counting down oscillations of oscillators 510 and 520. Controller 550 monitors the count in counter 530 and when the count reaches 0, controller 550 loads counter 530 with m (which is stored in register 560). If the temperature is −55° C., then at this time counter 540 will reach 0 and stop counter 530 and the −55° C. entry in counter 570 will be available as the temperature. However, if the temperature is greater than −55° C., then counter 540 has not yet reached 0 and counter 530 continues counting oscillations of oscillator 510. When counter 530 again reaches 0, controller 550 adds 1 to counter 570 (so the temperature entry is now −54° C.) and reloads counter 530 with m. This counting down from m repeats with an accompanying increment in counter 570 until counter 540 reaches 0. When counter 540 reaches 0 the correct temperature will be in counter 570, and count reaching 0 in counter 540 signal drives counter 570 to latch the temperature.

Once the count in counter 540 has reached 0, the next temperature measurement cycle could immediately begin or could be delayed and oscillator 520 turned off to conserve power. Oscillator 510 could provide a crude time keeping, which triggers another measurement cycle as determined by controller 550.

The foregoing example with m equal to 5 does not provide much precision, but simply using a large N, such as 1,000,000, would increase m to about 5,000 and yield greater precision. Note that N equal to 1,000,000 means a measurement lasting on the order of 1 second for 1Mhz oscillators. However, the size of the counters may become awkward for large N, and nonlinearities previously ignored would no longer be negligible for a high precision situation.

Figure 11:
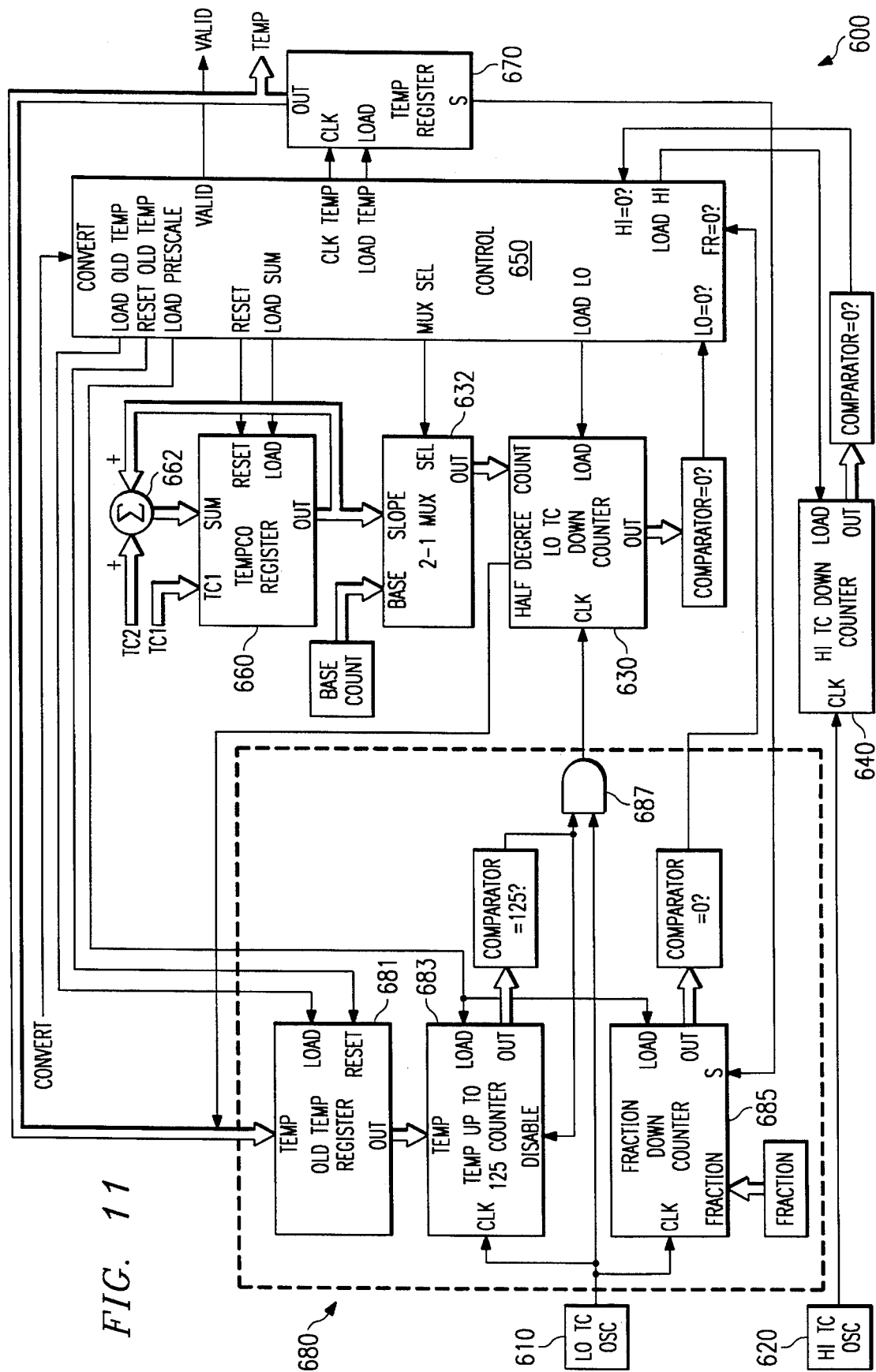
FIG. 11 is another preferred embodiment of a digital thermometer for sensor 402 in FIG. 9.

An alternative digital temperature detector could be used as well. FIG. 11 shows a second preferred embodiment of a digital thermometer for sensor 402, generally denoted by reference numeral 600, which includes low temperature coefficient oscillator 610 (about 200 KHz), high temperature coefficient oscillator 620 (about 100–200 KHz), 15-bit down counter 630, 2-to-1 multipliexer 632, 13-bit down counter 640, controller 650, intercept and slope registers 660, adder 662, output temperature register 670, and prescaler 680 (made of temperature iteration register 681, counter 683, and fractional down counter 685). Each of the down counters has a comparator for indicating when the count reaches 0, counter 683 has a comparator for indication when the count reaches 125 (the maximum temperature). The contents of output temperature register 670 are in 9-bit two's complement format with the least significant bit (LSB) representing 0.5 degree C. Thus register 670 can hold numbers between −128.0 and +127.5, but the temperature contents will always be in the range of −55 to 125. Monitoring the operation of detector 600 at three different temperatures provides calibration and leads to trimming of the operation parameters Base Count, TC1, TC2, and Fraction. The Base Count and TC1 parameters roughly correspond to the b and m parameters of detector 300. In essence, detector 600 numerically integrates a quadratic temperature dependence starting from −55 and using Base Count as the initial value, TC1 as the initial slope and TC2 as the constant slope derivative.

Detector 600 utilizes quadratic approximations as follows. Oscillators 610 and 620 have the architecture shown in FIG. 11 and emulate oscillators 310 and 320 in that oscillator 610 has a polysilicon resistor with resistance about 100 Kohms and oscillator 620 has a diffused resistor with resistance roughly 440 Kohms. The resistance of the oscillator resistors is presumed to have a quadratic temperature dependence over the range −55° to +125° C. The propagation delay through the comparator and flip-flop may also be presumed to have quadratic temperature dependence because this closely fits SPICE simulation results. Thus the oscillation period of each oscillator is quadratic in temperature, and the number of oscillations by oscillator 610 in a time period determined by oscillator 620 oscillating a fixed number of times is the ratio of two quadratic functions of temperature. Detector 600 has two modes of approximating this ratio of quadratics: (1) an overall quadratic fit and (2) the numerator quadratic plus an iterative mode with a linear fit for the denominator quadratic. The following paragraphs discuss the two modes of operation.

The first mode of operation does not employ prescaler 680 and is analogous to the operation of detector 300. First, for calibration the total number of oscillations of oscillator 610 during a count down from $2^{13}$ to 0 by counter 640 is assessed at three different temperatures (such as 10°, 50° and 90° C.) Then these three data points provide for a quadratic fit for the total number of counts as a function of temperature. That is, the total number of counts during a count down from $2^{13}$ is approximately $$M(T)=C_0+C_1T+C_2T^2$$

Thus, after determining $C_0$, $C_1$, and $C_2$, substituting in T equal to −55 will give M(−55) as the Base Count (corresponding to b in detector 300), and substituting T equal to −55 in the derivative $M'(T)=C_1+2C_2T$ gives $M'(-55)$=TC1 which is the slope at −55 (corresponding to "m" in detector 300). The slope increment TC2 is just $2C_2$.

Once the parameters Base Count, TC1, and TC2 have been determined and loaded into registers, the first mode of operation of detector 600 proceeds as follows. Down counter 640 has $2^{13}$ loaded and down counter 630 has Base Count loaded by multiplexer 632 selecting Base Count rather than the contents of register 660 (which has TC1 loaded); and −55 is loaded in register 670. Base Count may be on the order of 9000, the slope TC1 may be on the order of 50, and the slope increment may be on the order of 0.2. To avoid roundoff errors, TC1 and TC2 are expressed to an accuracy of 1/128 (7 fractional binary bits) and sums are truncated when loaded in counter 630. Oscillators 610 and 620 then drive down counters 630 and 640, respectively. When counter 630 reaches 0, controller 650 switches multiplexer 632 to load TC1 (the then-current contents of register 660) into counter 630 which starts counting down again. After loading TC1 from register 660 into counter 630, controller 650 drives register 660 to replace its contents TC1 with the sum TC1+TC2 from adder 662. Then when counter 630 again reaches 0, controller 650 increments the −55 in register 670 and again loads the contents of register 660 (now TC1+TC2) into counter 630, which continues counting down. As with detector 300, each time counter 630 reaches 0, controller 650 increments the temperature in register 670 and drives register 660 to increment its contents by TC2. Thus the contents of register 660 increase to reflect the quadratic approximation, and the successive countdowns by counter 630 slowly increase. Because TC2 is added up to 180 times, the 1/128 accuracy suffices. Also as with detector 300, once counter 640 has counted down from $2^{13}$ the incrementing of the temperature in register 670 ceases and register 670 contains the temperature output.

A comparison of the contents of down counter 630 to the contents of register 660 when counter 640 reaches 0 provides the 0.5 degree bit. In particular, if the contents of down counter 630 is less than half that of register 660, then the 0.5 degree bit is added to output register 670.

The second mode of operation of detector 600 uses prescaler 680 to provide a more accurate approximation and to permit iteration to achieve this approximation with minimal hardware. Essentially, the period of oscillator 620 is again approximated by a quadratic and determines the Base Count, TC1, and TC2; and the period of oscillator 610 is approximated by a linear temperature function and is used to block some of the oscillations from oscillator 610 from being counted by counter 630. Indeed, prescaler 680 operates as follows. First, the stream of oscillations from oscillator 610 is partitioned into groups by repetitively counting down in counter 685 from a parameter Fraction to 0; that is, the oscillations are partitioned into groups of size Fraction. Then at the start of each such group of oscillations, counter 683 begins counting up from the current temperature iteration stored in register 681 to +125, and while counter 683 counts up, its comparator output is low and feeds AND gate 687 to block the oscillation stream from counter 630. The temperature thus computed from the nonblocked oscillations appears, as in the overall quadratic approximation description, in register 670; and controller 650 then loads this temperature into register 681 to become the next temperature iteration for counter 683.

In more detail, during one temperature measurement cycle, counter 640 counts down from $2^{13}$ and oscillators 610 and 620 have periods $t_{LO}(T)$ and $t_{HI}(T)$, respectively, so oscillator 610 generates $2^{13}t_{HI}(T)/t_{LO}(T)$ oscillations during the cycle. Note that subscript LO indicates low temperature dependence and HI indicates high temperature dependence. Now if $t_{LO}$ were independent of temperature and $t_{HI}(T)$ had exactly quadratic temperature dependence, then the counting down by counter 630 with Base Count and TC1 and TC2 would give an exact temperature in register 670.

The quadratic approximation for $t_{HI}(T)$ is good, but $t_{LO}(T)$ increases with temperature by roughly 15% over the range −55° to +125° C. for a polysilicon resistor in oscillator 610. Indeed, $t_{LO}(T)$ may be linearly approximated by $t_{LO}(125)$ $[1-\alpha(125-T)]$ where, as before, $\alpha$ is the temperature coefficient of resistivity for polysilicon and roughly equal to 850 ppm/°C. Then determine Base Count, TC1, and TC2 from the quadratic $2^{13}t_{HI}(T)/t_{LO}(125)$ and use prescaler 680 to block a number of oscillations to compensate for the use of $t_{LO}(125)$ instead of $t_{LO}(T)$. Because counter 683 plus AND gate 687 block 125-T oscillations for each group of oscillations of size Fraction, $\alpha$ determines Fraction as follows. First, the number of oscillations passed by prescaler 680 during one measurement cycle is, disregarding the granularity due to Fraction:

$$[1-(125-T)/\text{Fraction}][2^{13}t_{HI}(T)/t_{LO}(T)]$$

Substituting in the linear approximation for $t_{LO}(T)$ and rearranging yields:

$$\{[\text{Fraction}-(125-T)]/\text{Fraction}\}2^{13}t_{HI}(T)/t_{LO}(125)\alpha(1/\alpha-(125-T))$$

Thus taking Fraction to equal $1/\alpha$ (on the order of 1200), the number of oscillations passed just equals $2^{13}t_{HI}(T)/T_{LO}(125)$, which is quadratic with the Base Count, TC1, and TC2 as used before.

The foregoing only presumed temperatures to the nearest degree, but the same procedure works for greater resolution. In particular, for half-degree resolution, an extra bit would appear in the temperature from register 681, counter 683 would be counting in half-degrees, and Fraction would be doubled.

Because counter 683 uses the temperature during computation of the temperature by down counter 630, successive approximation iterations must be used. Take +35 (the midpoint of −55 and +125) as a zeroth order approximation output temperature to load into register 681 and then compute a first order approximation output temperature, $T_1$, in register 670 by a first measurement cycle. Controller 650 then puts $T_1$ into register 681 and a second measurement cycle uses $T_1$ to compute a second order approximation $T_2$ in register 670. Controller 650 iterates five times to yield the final output temperature.

Figure 12A:
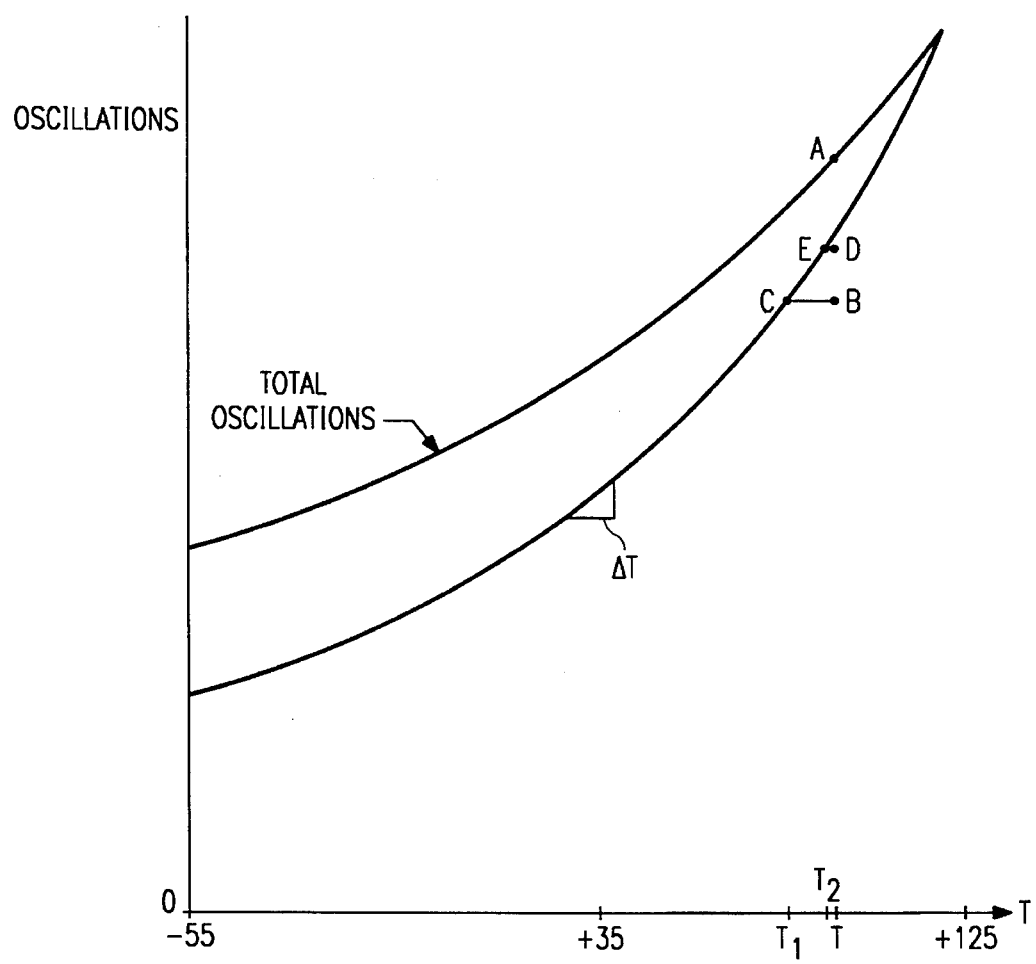
FIGS. 12A and 12B are graphs that illustrate the successive approximations of the digital thermometer shown in FIG. 11.
Figure 12B:
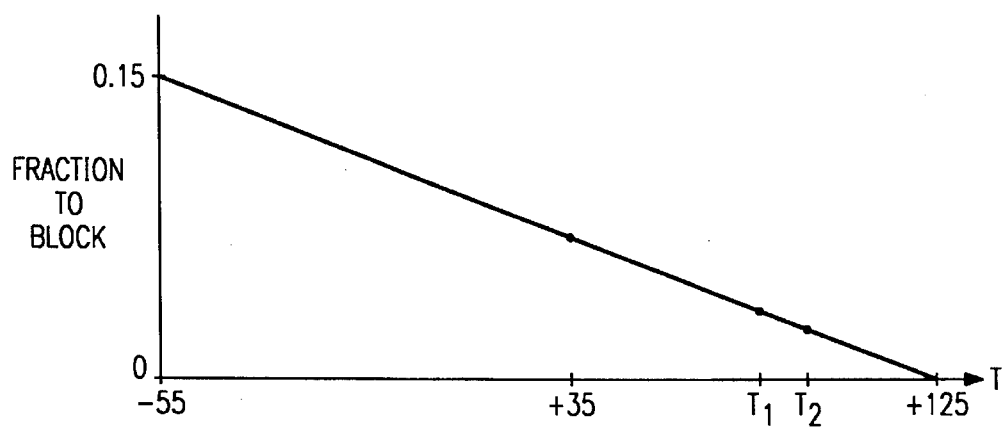

Referring to FIGS. 12A and 12B, FIGS. 12A and 12B graphically illustrate the successive approximations described above. If the temperature is T, point A in FIG. 9A indicates the number of oscillations from oscillator 610, and point B indicates the number passing through to counter 630 due to the use of +35 in register 681. B falls below the desired curve because too many oscillations are blocked due to the zeroth approximation, +35, being too low. The first order approximation temperature, $T_1$, computed in register 670 follows from point C on the desired curve as shown in FIG. 12A. This implies a smaller fraction to be blocked in during the second measurement cycle as indicated by FIG. 12B, and point D indicates the number passing through to counter 630 in FIG. 12A. The second order approximation temperature, T2, computed in register 670 follows from point E on the desired curve as shown in FIG. 12A. The further approximations lie too close to T to be shown in FIGS. 12 and 12B. For temperatures below +35, the successive approximations are analogous but converge to T from above the desired curve.

Figure 13:
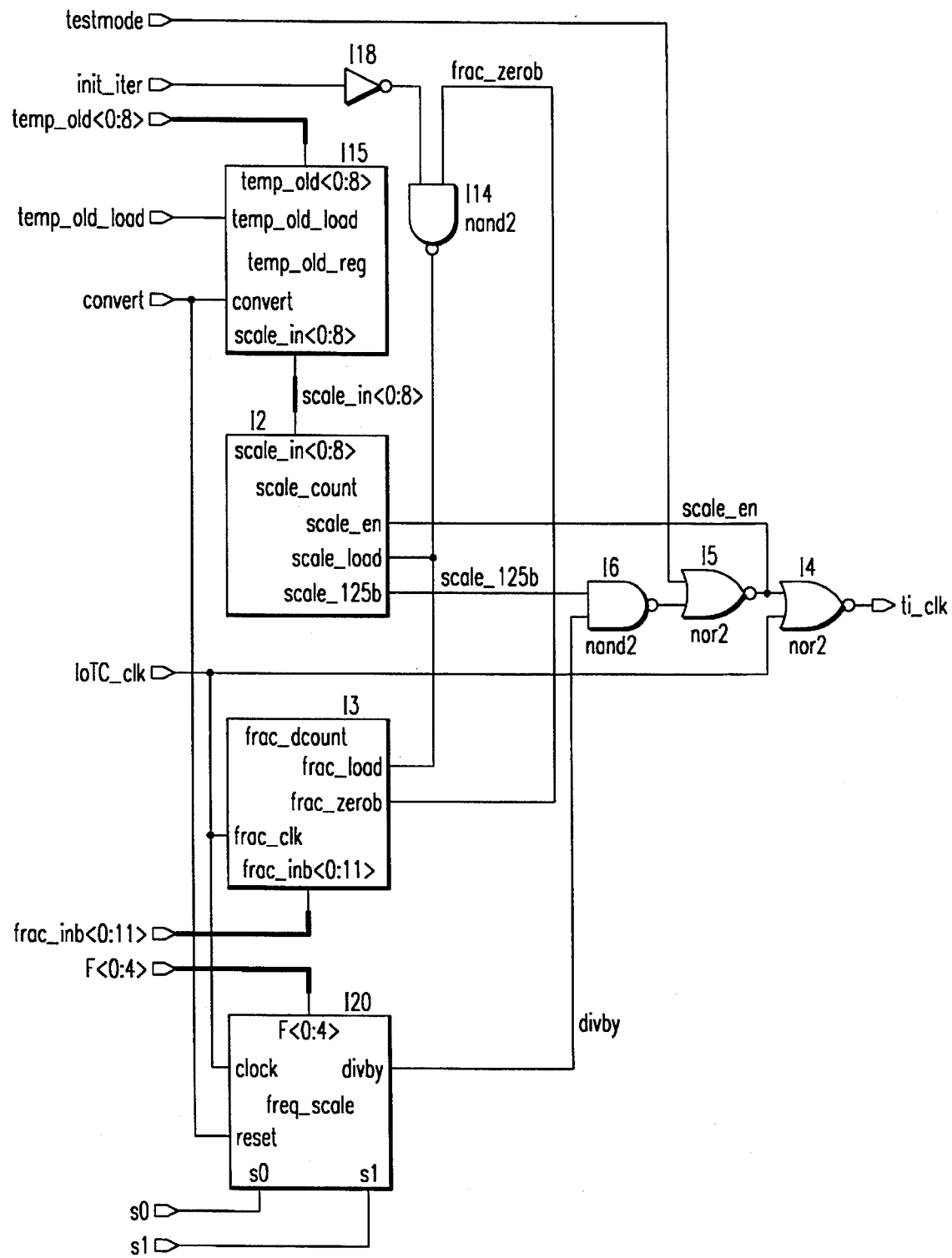
FIG. 13 shows the circuitry for prescaler 680.

FIG. 13 shows the circuitry for prescaler 680. Prescaler blocks a certain percentage of input clock pulses, making a scaled clock (ti__clk). Upon initialization, scale__count is loaded with the value corresponding to 35.0 degrees. Then, in a cycle of a calibrated or trimmed length (frac__inb), the appropriate number of pulses are blocked. The cycle is repeated until a new value gets loaded in the scale counter and then the whole process is repeated. Freq__scale is designed, so that the pulse blocking is spread throughout the whole frac dcount cycle instead of doing all of the pulse blocking at the beginning of each cycle. Note that prescaler 680 actually mitigates the granularity due to the size of Fraction by introducing a new parameter F and spreading out the blocking of oscillations by subgrouping a group of size Fraction into subgroups of size F and blocking only a fixed number from each subgroup according to the following table:

| Last Temperature | Number blocked per size F subgroup |
|---|---|
| $-55 \leq T < -10$ | 4 |
| $-10 \leq T < 35$ | 3 |
| $35 \leq T < 80$ | 2 |
| $80 \leq T \leq 125$ | 1 |

Signal line S in FIG. 11 provides the number to be blocked out of each size F subgroup of oscillations to counter 685. F is a trimmed value of up to 31 and is chosen to be the maximum integer less than 4 Fraction/360 for the case of half-degree resolution (360 is the number of half degrees in the range $-55°$ to $+125°$ C.). For example, if the temperature is $+10°$ C. and Fraction $=2500$ (half-degree resolution with $\alpha$ roughly 800 ppm/°C.), F would be 27. The total number of oscillations blocked per group of size Fraction (2500) would be 230, and 3 out of every 27 would be blocked until the total reached 230. That is, the first 2052 ($=27\times76$) oscillations in a group of 2500 (Fraction) would have $3\times76=228$ blocked, the next 27 would have 2 blocked to reach the 230 total, and the remaining 421 would not have any blocked.

This mitigates the granularity due to Fraction, as can be seen by continuing the example. First, presume that oscillator 610 puts out a total of 11,000 oscillations during one measurement cycle (a $2^{13}$ count down by counter 640). Because 230 oscillations are blocked out of each 2500, the first 10,000 ($=4\times2500$) oscillations will have 920 ($=4\times230$) blocked. Then, ideally during the last 1000 oscillations, $1000\times230/2500=92$ should be blocked. But prescaler 680 blocks 3 out of every 27, so 111 ($=3\times37$) will be blocked because 37 subgroups of size 27 fit into the last 1,000 with remainder 1. Thus the error would be a count of $111-92=19$, and this is roughly a 0.2 degree error when TC1 is about a typical 100. Without this spreading, the error would be much greater. In particular, if the 230 oscillations to be blocked out of each 2500 are the first 230, then in this example, 230 out of the last 1000 would have been blocked and the error would have been $230-92=138$, which translates to roughly 1.4 degree for TC1 about 100.

The calibration of temperature detectors 500 and 600 to set the parameters (b and m for detector 300 and Base Count, TC1, TC2, Fraction, and F for detector 600) proceeds simply by holding a detector in a temperature controlled chamber (with temperature being measured) while the oscillators 310 and 320 or 610 and 620 run and the number of oscillations or the frequency is measured in a test mode at three different temperatures (such as the 10°, 50° and 90° C. previously noted). The parameters are then computed and entered into the detector and may reside in EPROM or other nonvolatile memory. This calibration occurs after packaging of the integrated circuit. The data may also be stored in a hard disk or other media at each temperature and retrieved when the parameters are to be calculated.

Figure 14:
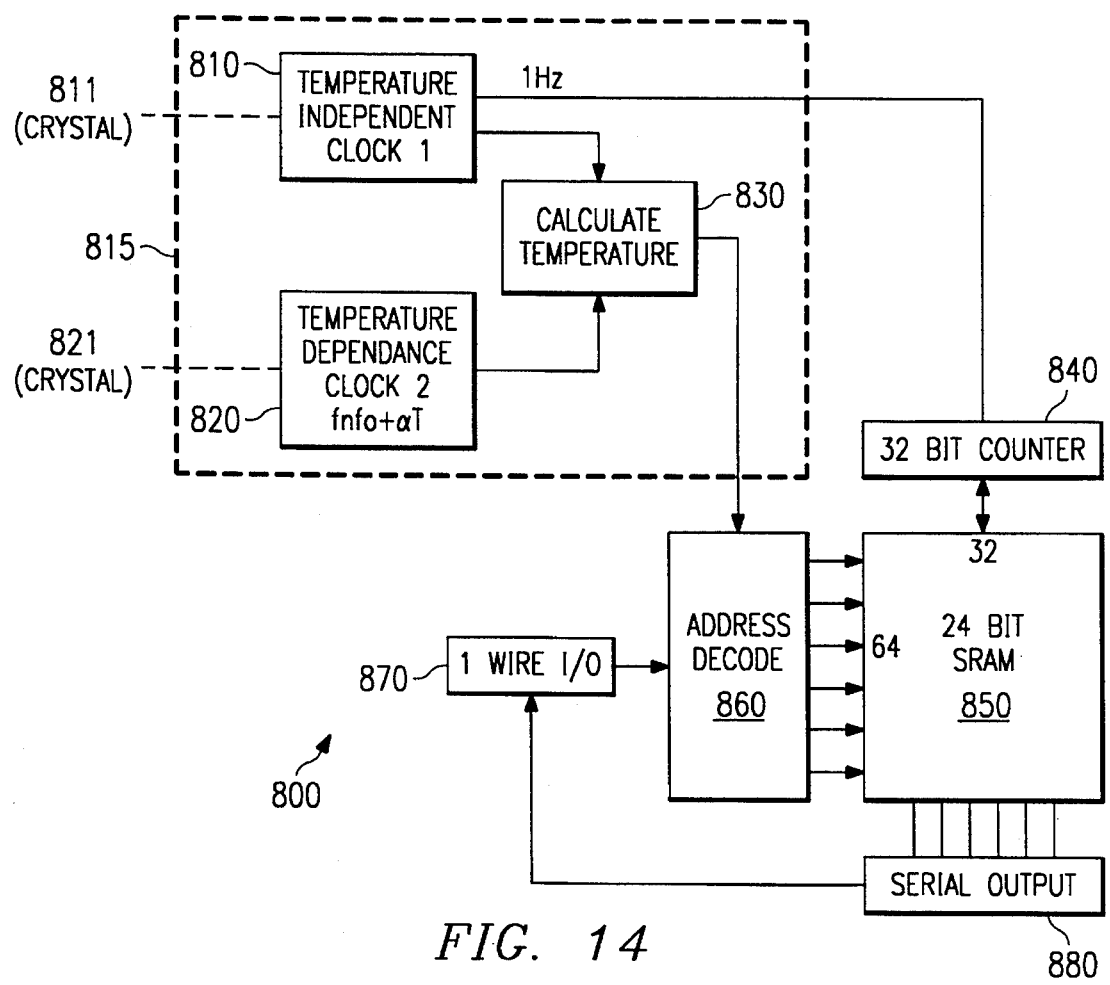
FIG. 14 is an alternative preferred functional block circuit diagram of a histogram generator shown in FIG. 6 or, more particularly, of a thermal history chip.

FIG. 14 is an alternative preferred functional/structural block circuit diagram of a histogram generator shown in FIG. 6 or, more particularly, of a thermal history chip. This alternate preferred embodiment of temperature histogram generator is generally denoted by reference number 800, which comprises temperature independent clock 810, temperature dependent clock 820, temperature calculator 830, 32 bit counter 840, 32×64 bit SRAM module 850, address decoder 860, 1-wire I/O interface 870, and serial output module 880. The temperature independent clock 810, which comprises crystal 811 for increased reliability, generates both a slow clock signal and a fast clock signal both of which do not vary significantly with temperature. Temperature dependent clock 820, which may include a crystal 821, which has a linear frequency vs. temperature dependence, generates a fast clock signal whose period varies with temperature. Temperature calculator 830 takes input from both clocks 810 and 820 in order to determine the temperature. This temperature calculator could be a pair of counters which count the 2 separate clock signals and takes the difference between them when one of the counters reaches a predefined value. This difference would be approximately proportional to the temperature. This temperature value would be sent to the address decoder 860 to select a SRAM address. Then when the slow clock signal from time independent clock 810 has a transition, a 32 bit word of data is read from the SRAM into the 32 bit counter 840. This counter is incremented by 1 and the data is returned to the SRAM with the address given by the address decoder 860. At any time, the 1 wire I/O interface 870 may be used to either read the data out of the SRAM, write data into the SRAM or simply reset it. Consequently, the contents of the SRAM 110 would be read at the end of a time period of interest and a single computation performed to evaluate the integral. The system can postprocess this information externally with respect to any function. The general scheme of the preferred embodiment shown in FIG. 14 resembles that of histogram generator 100 described above and shown in FIG. 6, In particular, sensor 102 (in FIG. 6) corresponds to the specific combination of clocks 810 and 820 and temperature calculator 830 (in FIG. 14), which denoted by reference number 815. Selector 106 (in FIG. 6) corresponds to address decoder 860 (in FIG. 14). Counter array 110 (in FIG. 6) corresponds to the SRAM 850 and the 32 bit counter 840 (in FIG. 14).

FURTHER MODIFICATION

Although particular embodiments of the present invention have been shown and described, it will be obvious to those skilled in the art that various changes and modifications may be made in many ways while retaining one or more of the features of the invention without departing from the spirit and scope of the invention. For example, it is foreseeable that one skilled in the art may design software configurations that emulate the functionality of selector 106 in FIG. 1, and a plurality of counters that form counter array 110 in FIG. 1, even though the preferred embodiments discussed above are primarily analog and digital hardware configurations. As those skilled in the art recognize, software embodiments may be written in modern high level programming languages, such as Fortran, Basic, Pascal, and Ada and compiled with modern compilers, such as Fortran compilers, Basic compilers, Pascal compilers, and Ada compilers. The compiled software may run on general purpose computers, such as a VAX or Personal Computer, or on specially designed computer chips. In addition, there may be some systems for which the simultaneous measurement of two or more physical variables as a function of time may be important. In this case, the number of storage bins must be increased to cover all possible combinations of both variables. The histogram generator can be generalized to any number of physical variables.

What is claimed is:

1. A system to monitor power consumption of a battery in a battery pack, wherein said battery has a charge, comprising:

(a) said battery, having a temperature value at a first time;

(b) temperature sensor circuitry packaged together with said battery in said battery pack, said temperature sensor circuitry sampling said temperature value at said first time to produce a sample of said temperature value, said sample of said temperature value being within a range of temperature values, said sample being in a digital format;

(c) selector circuitry and accumulating circuitry electrically coupled to said temperature sensor circuitry to receive said sample of said temperature value in said digital format, said selector circuitry and said accumulating circuitry electrically coupled together, said selector circuitry and said accumulating circuitry packaged together with said battery, in said battery pack, said selector circuitry allocating said sample of said temperature value into a corresponding counter of a counter array of said accumulating circuitry, said corresponding counter accumulating a number of occurrences of said temperature value of said sample of said temperature value, said selector circuitry dividing said range of temperature values into a plurality of bins such that said sample of said temperature value corresponds to at least one bin of said plurality of bins, said selector circuitry also allocating said sample to said corresponding counter of said counter array of said accumulating circuitry depending upon said at least one bin that said sample of said temperature value corresponds to, each corresponding counter having a counter output, said counter output of said corresponding counter combined to form a histogram recording said number of occurrences of said sample having said temperature value in said digital format; and (d) a computer electrically coupled to said accumulating circuitry to read said counter outputs combined to form said histogram, said computer calculating a current state of said charge of said battery in said battery pack by calculating an elapsed time of said battery by substituting information conveyed by said histogram into the following equation:

$$\sum_{j=0}^{M} f_j * T_j$$

wherein f, T, j, and M are variables in which $f_j$ denotes said number of occurrences for bin j of said at least one bin and $T_j$ denotes total time for said bin having a number j, further wherein said number j is a number identifier identifying a specific bin j of said plurality of bins, and M is a number identifying a maximum number of j's.

2. The system to monitor power consumption of a battery in a battery pack of claim 1 wherein said computer is portable.

3. A system to monitor power consumption of a battery in a battery pack, comprising:

(a) said battery having a temperature value at a first time;

(b) temperature sensor circuitry packaged together with said battery in said battery pack, said temperature sensor circuitry sampling said temperature value at said first time to produce a sample of said temperature value, said sample of said temperature value being within a range of temperature values, said sample being in a digital format;

(c) selector circuitry and accumulating circuitry electrically coupled to said temperature sensor circuitry to receive said sample of said temperature value in said digital format, said selector circuitry and said accumulating circuitry electrically coupled together, said selector circuitry and said accumulating circuitry packaged together with said battery in said battery pack, said selector circuitry allocating said sample of said temperature value into a corresponding counter of a counter array of said accumulating circuitry, said corresponding counter accumulating a number of occurrences of said temperature value of said sample of said temperature value, said selector circuitry dividing said range of temperature values into a plurality of bins such that said sample of said temperature value corresponds to at least one bin of said plurality of bins, said selector circuitry, also allocating said sample to said corresponding counter of said counter array of said accumulating circuitry, depending upon said at least one bin that said sample of said temperature value corresponds to, each corresponding counter having a counter output, said counter output of said corresponding counter combined to form a histogram recording said number of occurrences of said sample having said temperature value in said digital format; and (d) a computer electrically coupled to said accumulating circuitry to read said counter outputs combined to form said histogram, said computer calculating current state of charge of said battery in said battery pack using Arrhenius' Law, wherein said computer is portable.

4. A histogram generator system, comprising:

(a) a sensor that periodically samples a value of a physical variable to produce at least one sample of said physical variable; and (b) a selector that allocates each sample of said value of said physical variable into a corresponding counter of a counter array, said counter accumulating a number of occurrences of said value of said sample(s) of said physical variables, wherein said physical variable is temperature and said sensor is a temperature detector, and wherein said temperature detector comprises (i) a temperature-to-time first converter, said first converter outputting a time interval with length depending upon an input temperature;

(ii) a time-to-number second converter, said second converter with input coupled to a time interval output of said first converter, whereby said second converter outputs a number version of said input temperature, and wherein said first converter comprises a first oscillator with a temperature dependent period coupled to a counter, said time interval being the time for said counter to count a predetermined number of oscillations of said first oscillator; and wherein said second converter comprises a second oscillator coupled to a second counter, with said second counter counting oscillations of said second oscillator for said time interval.

5. The histogram generator system of claim 4, wherein:

(a) said second converter comprises a prescaler between said second oscillator and said second counter, said prescaler blocking a fraction of said oscillations from said second oscillator from driving said second counter.

6. The histogram generator system of claim 4, further comprising:

(a) an output temperature register; and (b) a repetition controller coupled to said first and second converters and said output temperature register;

(c) wherein during said time interval said controller first (i) loads a base count into said second counter and a base temperature into said output temperature register, next (ii) when said second counter has counted down said base count, said controller loads a slope count into said second counter, then (iii) when said second counter has counted down said slope count, said controller increments said base temperature in said output temperature register and loads a second slope count into said second counter, and (iv) said controller repeats incrementing the contents of said output temperature register and slope loading until said time interval expires.

7. The histogram generator system of claim 6, wherein said second converter includes a slope incrementer coupled to said second counter and to said controller.

* * * * *

UNITED STATES PATENT AND TRADEMARK OFFICE
CERTIFICATE OF CORRECTION

PATENT NO. : 5,552,999                  Page 1 of 2
DATED : September 3, 1996
INVENTOR(S) : Polgreen et al.

It is certified that error appears in the above-indentified patent and that said Letters Patent is hereby corrected as shown below:

Column 8, line 2      Replace "in"
With --ln--

Column 8, line 59      Replace "$T_o$"
With --$T_0$--

Column 11, line 13      Replace "= $Nt_{Hi}(T)$"
With --= $Nt_{HI}(T)$--

Column 11, line 51      Replace "$T_o$"
With --$T_0$--

Column 12, line 37      Replace "125."
With --+125.--

Column 13, line 3      Replace "C.)"
With --C.).--

Column 13, line 14      Replace "TCl"
With --TC1--

Column 13, line 46      Replace "$2^{13}$"
With --$2^{13}$,--

UNITED STATES PATENT AND TRADEMARK OFFICE
CERTIFICATE OF CORRECTION

PATENT NO. : 5,552,999

DATED : September 3, 1996

INVENTOR(S) : Polgreen et al.

It is certified that error appears in the above-indentified patent and that said Letters Patent is hereby corrected as shown below:

| | |
|---|---|
| Column 15, line 25 | Replace "frac dcount" With --frac_dcount-- |
| Column 17, line 27 | Replace "battery," With --battery-- |
| Column 17, line 42 | Replace "battery," With --battery-- |
| Column 18, line 39 | Replace "circuitry," With --circuitry-- |
| Column 18, line 41 | Replace "circuitry," With --circuitry-- |

Signed and Sealed this

Twenty-sixth Day of August, 1997

*Attest:*

BRUCE LEHMAN

*Attesting Officer*  Commissioner of Patents and Trademarks